US012762600B2

(12) United States Patent
Zhang et al.

(10) Patent No.: US 12,762,600 B2
(45) Date of Patent: Oct. 13, 2026

(54) INTERACTIVE RECOMMENDATION METHOD, ELECTRONIC DEVICE, AND STORAGE MEDIUM

(71) Applicant: Alibaba Singapore Holding Private Limited, Singapore (SG)

(72) Inventors: Lei Zhang, Hangzhou (CN); Yunying Yuan, Hangzhou (CN)

(73) Assignee: Alibaba Singapore Holding Private Limited, Singapore (SG)

( * ) Notice: Subject to any disclaimer, the term of this patent is extended or adjusted under 35 U.S.C. 154(b) by 121 days.

(21) Appl. No.: 18/584,715

(22) Filed: Feb. 22, 2024

(65) Prior Publication Data

US 2024/0420213 A1 Dec. 19, 2024

(30) Foreign Application Priority Data

Jun. 14, 2023 (CN) ......................... 202310706339.2

(51) Int. Cl.

*G06Q 30/00* (2023.01)
*G06F 9/451* (2018.01)
*G06Q 30/0601* (2023.01)

(52) U.S. Cl.

CPC ......... *G06Q 30/0631* (2013.01); *G06F 9/451* (2018.02); *G06Q 30/0643* (2013.01)

(58) Field of Classification Search

CPC ................................................ G06Q 30/0631
See application file for complete search history.

(56) References Cited

U.S. PATENT DOCUMENTS 7,366,721 B1 * 4/2008 Bennett .............. G06Q 30/0603 707/999.01
9,875,284 B1 * 1/2018 Amacker .......... G06F 16/24578
(Continued)

FOREIGN PATENT DOCUMENTS

CN 102385601 A 3/2012
CN 111221450 A 6/2020
(Continued)

OTHER PUBLICATIONS

Marathe, Mona, and Hemalatha Diwakar. "The architecture of a one-stop web-window shop." ACM SIGecom Exchanges 2.1 (2000): 11-18.*

(Continued)

*Primary Examiner* — Kathleen Palavecino
(74) *Attorney, Agent, or Firm* — Sheppard Mullin Richter & Hampton LLP

(57) ABSTRACT

This application provides an interactive recommendation method, electronic device, and storage medium. The method comprises displaying recommended product information in a first area of a webpage; in response to a user's trigger action on a current product in the first area, recording the user's behavior into feature information, which includes user characteristics and product characteristics; sending the current product's information and feature information to a server; receiving information of similar products returned from the server, wherein the similar products are selected by the server from a product database and resulted from sorting and filtering based on the feature information; inserting a second area of original size on the webpage; and displaying information of the similar products in the second area. According to the embodiments of this application, recommendations are made based on user interaction behavior,
(Continued)

achieving a balance between precision and diversity in recommendations.

15 Claims, 8 Drawing Sheets

(56) References Cited

U.S. PATENT DOCUMENTS

| | | | | |
|---|---|---|---|---|
| 10,621,648 | B2 | 4/2020 | Davis | |
| 10,789,622 | B2 | 9/2020 | Ayush et al. | |
| 10,789,637 | B1 | 9/2020 | Jain et al. | |
| 10,817,749 | B2 | 10/2020 | Biswas et al. | |
| 10,956,967 | B2 | 3/2021 | Ayush et al. | |
| 11,042,922 | B2 | 6/2021 | Onoro Rubio et al. | |
| 11,055,764 | B2 | 7/2021 | Kounine et al. | |
| 11,115,492 | B2 | 9/2021 | Yankovich et al. | |
| 11,157,244 | B2 | 10/2021 | Bodin et al. | |
| 11,200,445 | B2 | 12/2021 | Afshar et al. | |
| 11,315,164 | B2 | 4/2022 | Bhattacharjee | |
| 11,354,721 | B2 | 6/2022 | Jiang et al. | |
| 11,538,083 | B2 | 12/2022 | Sewak et al. | |
| 11,610,247 | B2 | 3/2023 | Beauchamp | |
| 11,687,994 | B2 | 6/2023 | Jikomes et al. | |
| 11,714,518 | B2 | 8/2023 | Gharpuray | |
| 11,734,747 | B2 | 8/2023 | Zielnicki | |
| 2009/0063972 | A1* | 3/2009 | Ma | G06F 3/0482 715/765 |
| 2010/0070529 | A1* | 3/2010 | Gokturk | G06Q 30/02 715/764 |
| 2012/0311139 | A1 | 12/2012 | Brave et al. | |
| 2014/0074652 | A1* | 3/2014 | Wu | G06Q 30/0631 705/26.7 |
| 2014/0229342 | A1* | 8/2014 | Marlowe | G06Q 30/0643 705/27.2 |
| 2019/0018562 | A1* | 1/2019 | Bernstein | G06F 3/0485 |
| 2019/0392330 | A1 | 12/2019 | Martineau et al. | |
| 2021/0065277 | A1 | 3/2021 | Bramson et al. | |
| 2021/0073891 | A1 | 3/2021 | Al Jadda et al. | |
| 2021/0110475 | A1 | 4/2021 | Singh et al. | |
| 2021/0166103 | A1 | 6/2021 | Jackson et al. | |
| 2021/0182948 | A1* | 6/2021 | Du | G06F 3/0483 |
| 2021/0233151 | A1 | 7/2021 | Rahman et al. | |
| 2021/0248656 | A1 | 8/2021 | Makowsky et al. | |
| 2023/0083474 | A1 | 3/2023 | Privitelli et al. | |

FOREIGN PATENT DOCUMENTS

| | | | |
|---|---|---|---|
| CN | 112749322 | A | 5/2021 |
| WO | 2023033223 | A1 | 3/2023 |

OTHER PUBLICATIONS

Extended European Search Report for European Patent Application No. 24156876.5 mailed on Apr. 15, 2024.

First Office Action for Chinese Application No. 202310706339.2 mailed on Jun. 17, 2026.

* cited by examiner

INTERACTIVE RECOMMENDATION METHOD, ELECTRONIC DEVICE, AND STORAGE MEDIUM

CROSS REFERENCE TO RELATED APPLICATIONS

The present application claims priority to and benefits of Chinese Patent Application No. 202310706339.2, filed on Jun. 14, 2023. The entire contents of the above-identified application are incorporated herein by reference.

TECHNICAL FIELD

The present application relates to the field of recommendation technologies, specifically relating to an interactive recommendation method, electronic device, and storage medium.

BACKGROUND

When platforms provide products to users, they often aim to accurately capture the interests of users and offer the most precise recommendations to enhance efficiency. However, there is a concern that overly precise recommendations may fail to ensure diversity, leading to user fatigue and impacting the overall experience. Therefore, balancing the precision and diversity of recommendations has always been a challenging issue.

Currently, most platforms adopt a paginated recommendation approach, presenting products to users across multiple pages. However, when users browse the products on the current page, the user behavior data from the previous page cannot be collected and utilized in a timely manner. As a result, it is not possible to make recommendations based on user interaction behavior, leading to weak user interaction perception, and the recommendation results hardly reflect the user's interests.

SUMMARY

In the embodiments of this application, an interactive recommendation method, device, electronic equipment, and storage medium are provided to achieve recommendations based on user interaction behavior.

In a first aspect, the embodiments of the application provide an interactive recommendation method, which includes: displaying information of recommended products in a first area having an original size of a page; in response to a user's trigger operation on the current product in the first area, recording the user's behavior into feature information, which includes user characteristics and product characteristics; sending the information of the current product and the feature information to a server; receiving information of similar products returned from the server, wherein these similar products are selected by the server from a product database, being similar to the current product and obtained after sorting and filtering based on the feature information; inserting a second area of the original size on the page; and displaying information of the similar products in the second area.

In one embodiment, the browsing direction of the page is vertical, with the page arranged in multiple columns in the horizontal direction. The width of the original size is the width of the column, and the height is the height of the product information display area. Alternatively, if the browsing direction of the page is horizontal, the page is arranged in multiple rows in the vertical direction. In this arrangement, the width of the original size is the width of the product information display area, and the height is the height of the row.

In one embodiment, after displaying information of the similar products in the second area, the method further includes: responding to the user's scrolling action along the browsing direction in the second area, determining whether the number of similar products browsed by the scrolling action exceeds a threshold. If the number of the similar products browsed by the scrolling action exceeds the threshold, then the size of the second area is enlarged from the original size to an enlarged size for display, wherein the area of the enlarged size is larger than that of the original size.

In one embodiment, after displaying information of the similar products in the second area, the method further includes: responding to the user's scrolling action along the browsing direction in the first area, determining whether the number of recommended products browsed by the scrolling action exceeds a threshold. If the number of recommended products browsed by the scrolling action exceeds the threshold, then the size of the second area is reduced from the original size to a reduced size for display, while maintaining the display of similar products in the second area as the currently browsed similar products, wherein the area of the reduced size is smaller than that of the original size.

In one embodiment, after reducing the size of the second area from its original dimensions to a reduced size for display, the process further includes: in response to a user's scrolling action within the second area along a browsing direction, determining whether the number of similar items browsed by the scrolling action exceeds a threshold; if the number of similar items browsed by the scrolling action exceeds the threshold, then restoring the size of the second area from the reduced size to its original dimensions for display.

In one embodiment, after displaying the second area in a reduced size from its original dimensions, the process further includes:

in response to the user's rollback operation within the first area, maintaining the size of the second area at the reduced size for continued display, wherein this rollback operation refers to a scrolling action in the direction of previously browsed items.

In one embodiment, after reducing the size of the second area from its original dimensions to a reduced size for display, the process further includes:

acquiring the categories of the products that have been exposed in the second area; sending the information of the exposed products to the server; receiving information about diverse products from the server, wherein these diverse products are selected by the server from the product database according to a diversity strategy and sorted and filtered based on the feature information, with the categories of the exposed products being down-weighted in the diversity strategy; displaying the information of these diverse products in the second area.

In one embodiment, after displaying the information of the similar products in the second area, the process further includes:

in the recommended products within the first area, performing a down-weighting operation on the products that belong to the same category as the current product. This down-weighting operation includes reducing the sorting priority or removing the display of these products.

In one embodiment, the triggering operation is either a click on the current product or staying within the display area of the current product for longer than a specified duration; the user's behaviors include at least one of the following: clicking, adding to the shopping cart, favoriting/bookmarking, or sharing; the product features include static features and dynamic features, wherein the dynamic features include statistical information about the product.

In a second aspect, embodiments of this application provide an interactive recommendation method, which includes:

receiving the information and feature data of the current product sent from the client; selecting similar products to the current product from the product database, wherein the similar products share the same category as the current product; sorting and filtering these similar products based on the user features and product features included in the feature information, wherein the user features include the behaviors of the user recorded by the client; re-sorting the sorted and filtered similar products based on the principle of having adjacent products with differing attributes; sending the information of the re-sorted similar products to the client.

In one embodiment, selecting similar products to the current product from the product database, wherein the similar products share the same category as the current product, includes:

identifying candidate products in the product database that share the same category as the current product; finding candidate products that have a similar relationship with the current product based on known product similarity relationships, thereby obtaining the similar products to the current product.

In one embodiment, the aforementioned method further includes:

receiving information about the products that have been exposed in the second area from the client, wherein the second area is used to display information about similar products; selecting diverse products from the product database according to a diversity strategy, wherein the categories of the exposed products are down-weighted in the diversity strategy; sorting and filtering these diverse products based on the user features and product features included in the feature information, wherein the user features include the behaviors of the user recorded by the client; re-sorting the sorted and filtered diverse products based on the principle of having adjacent products with differing attributes; sending the information of the re-sorted diverse products to the client.

In a third aspect, embodiments of this application provide an interactive recommendation device, which includes:

a first display module for displaying information about recommended products in the first area of a page;

a response module for responding to the user's triggering operation on the current product within the first area, recording the user's behavior into the feature information, which includes user features and product features;

a sending module for sending information about the current product and its feature information to the server;

a receiving module for receiving information about similar products returned by the server, wherein these similar products are selected by the server from the product database and sorted and filtered based on the feature information to be similar to the current product;

an insertion module for inserting a second area of original size on the page;

a second display module, used for displaying information about similar products within the second area.

In a fourth aspect, embodiments of this application provide an interactive recommendation device, which includes:

a receiving module for receiving information about the current product and its feature information sent from the client;

a selection module for selecting similar products to the current product from the product database, wherein the similar products share the same category as the current product;

a filtering module for sorting and filtering similar products based on the user features and product features included in the feature information, wherein user features include the behaviors of the user recorded by the client;

a re-sorting module for re-sorting the sorted and filtered similar products based on the principle of having adjacent products with differing attributes;

a sending module for sending information about the similar products, which have been re-sorted, to the client.

In a fifth aspect, embodiments of this application provide an electronic device, comprising a memory, a processor, and computer program stored in the memory. The processor, when executing the computer program, implements any one of the methods described above.

In a sixth aspect, embodiments of this application provide a computer-readable storage medium. This storage medium includes computer program, which, when executed by a processor, implements any one of the methods described above.

Compared to existing technologies, this application has the following advantages:

By responding to the user's triggering action on the current product displayed in the first area of the page, and recording the user's behavior into feature information, this application sends information about the current product and its features to the server and receives information about similar products returned by the server. By inserting a second area on the page to display information about similar products, it achieves recommendation based on the user's interactive behavior. The similar products recommended in the second area not only meet the user's need for precision but also, along with the recommended products in the first area, create a diversified set of recommendations. This approach balances both precision and diversity in the recommendation goals, continuously expanding the user's interest boundaries and avoiding the fatigue caused by a monotonous information flow. Additionally, the second area is inserted directly into the page, eliminating the need for users to navigate elsewhere, making the operation straightforward and user-friendly. The display of similar products provides timely feedback on user intent, achieving real-time perception of user behavior and personalized interactive recommendations. This enhances user engagement and improves the perception of user interaction.

By receiving information about the current product and its feature data sent from the client, selecting similar products to the current product from the product database, sorting and filtering these similar products based on the feature information, and then re-sorting them according to the principle of having adjacent products with differing attributes, the application sends the information of the re-sorted similar products back to the client. This achieves recommendations based on the user's interactive behavior, meeting the user's need for precision. It continuously expands the user's interest boundaries and avoids the fatigue caused by a monotonous information flow, thereby fulfilling the dual objectives of precision and diversity in user engagement.

The above description is only an overview of the technical solutions of this application. To gain a clearer understanding of the technical means of this application, they can be implemented in accordance with the contents of the specification. Furthermore, to make the aforementioned and other objectives, features, and advantages of this application more apparent and understandable, specific embodiments of this application are cited below.

BRIEF DESCRIPTION OF THE DRAWINGS

In the accompanying drawings, unless otherwise specified, the same reference numerals across multiple figures represent the same or similar components or elements. It should be noted that these drawings are not necessarily drawn to scale. It should be understood that these drawings merely depict some embodiments in accordance with this application and should not be considered as limiting the scope of this application.

DETAIL DESCRIPTION OF THE EMBODIMENTS

Figure 1:
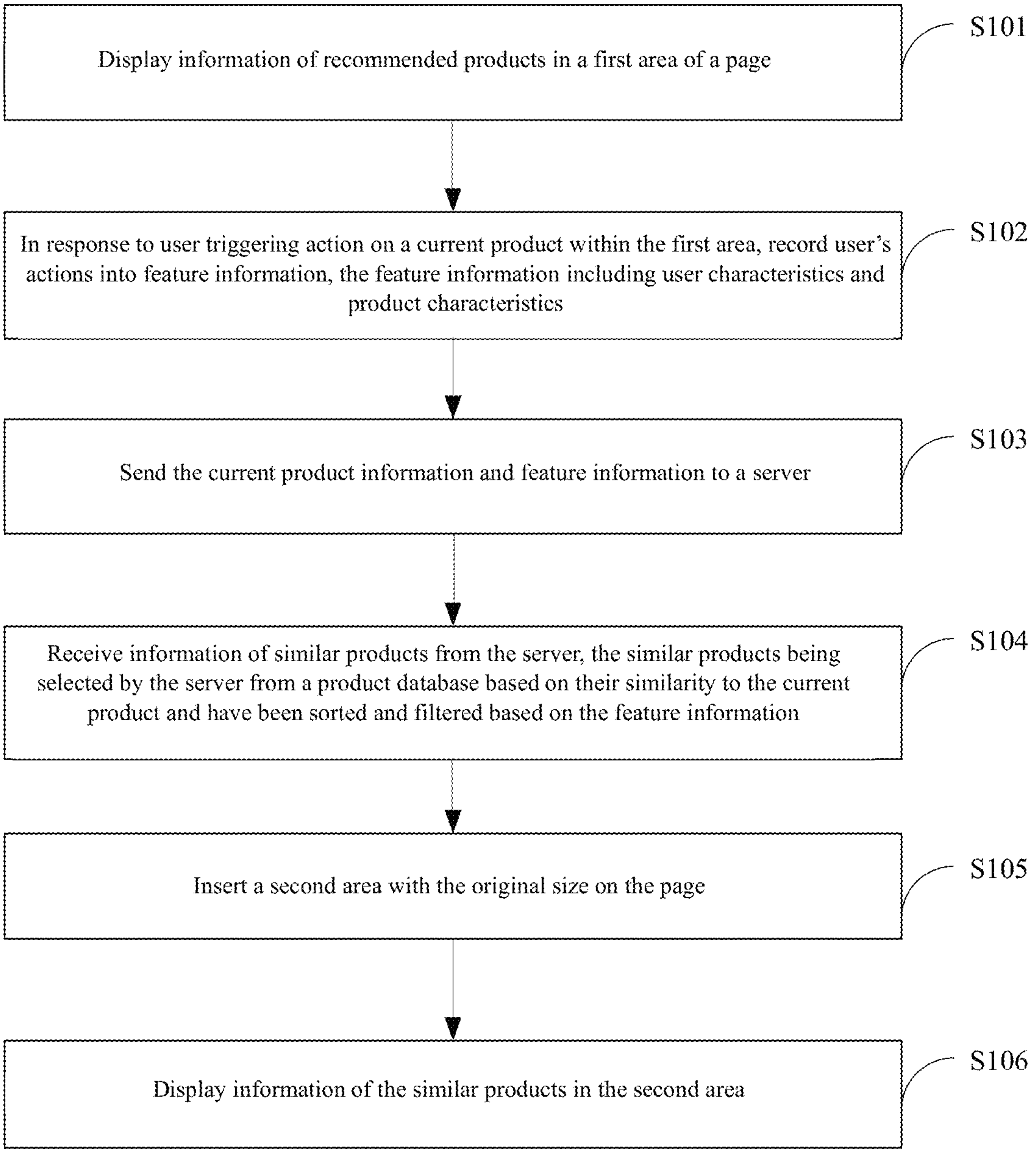
FIG. 1 is a flowchart of the interactive recommendation method according to an embodiment of this application.

In the following text, only some exemplary embodiments are briefly described. As those skilled in the art can recognize, the described embodiments can be modified in various ways without departing from the spirit or scope of this application. Therefore, the drawings and descriptions are considered to be essentially illustrative and not restrictive.

To facilitate the understanding of the technical solutions of the embodiments of this application, the following provides an explanation of the relevant technologies pertaining to these embodiments. The following related technologies, as optional solutions, can be arbitrarily combined with the technical solutions of the embodiments of this application, and all fall within the scope of protection of these embodiments.

First, an explanation of the terminology involved in this application is provided.

Paginated Recommendation: In response to a user's single request, the returned set of products is recommended through a paginated format. Each page can recommend a specified number of products, and the entire set of products is recommended to the user across multiple pages. The specified number can be set as needed. For example, it could be any value between 20 and 50. Paginated recommendation allows the system resource consumption to be controlled within a reasonable range and ensures a smooth browsing experience for the user when viewing the information flow.

Interactive Recommendation: This refers to a recommendation method wherein there is explicit interaction between the user and the recommendation system. The recommendation system adjusts the recommended content based on the user's behavior. The user's behavior can occur multiple times, and the adjustment operations are generated in real-time following the user's actions.

Triggering Operation: This is the trigger signal in the recommendation system and is the origin of the interactive recommendation process. The entire interactive recommendation process is initiated through the triggering operation. Triggering operations include, but are not limited to, active user interactions such as clicking, adding to shopping cart, favoriting/bookmarking, or sharing.

The interactive recommendation method provided in the embodiments of this application can be applied to any electronic device, including but not limited to: computers, mobile terminals, tablets, laptops, or servers. On the screen of these electronic devices, users can be provided with recommendations through the aforementioned interactive recommendation method. There can be a variety of specific application scenarios, including but not limited to use in page displays or website page displays. For example, this interactive recommendation method could be implemented on a specific application page on a mobile phone, or on a webpage viewed in a computer browser, without specific limitations. The interactive recommendation involved in the embodiments of this application refers to the interaction between the user and the electronic device, wherein the user can trigger interactions with the electronic device through touch (e.g., using fingers), a mouse, or a keyboard.

The embodiments of this application provide an interactive recommendation method, applied to a client. As shown in FIG. 1, which is a flowchart of the interactive recommendation method according to an embodiment of this application, the method can include the following steps.

S101: Display information about recommended products in a first area of the page.

In the embodiments of this application, the term "page" refers to the page on which information about recommended products is displayed to the user. The first area is any area on the page and can occupy all or part of the page's surface area, without specific limitation.

The products corresponding to the recommended product information displayed in the first area can be determined based on an initial recommendation strategy, such as according to user characteristics or personal preferences. The embodiments of this application do not specifically define the initial recommendation strategy.

S102: In response to the user's triggering operation on the current product within the first area, record the user's behavior into feature information, which includes user features and product features.

The current product can be any one of the products displayed in the first area. Triggering operations include but are not limited to a click on the current product or staying within the display area of the current product for longer than a specified duration. The click operation can be a single click or a double click, and the specified duration can be set as needed, such as 1 second, 2 seconds, etc.

The user behavior in this step refers to the aforementioned triggering operation. During the recommendation process, the user's behavior can be recorded at any time. This recorded behavior includes but is not limited to at least one of the following: clicking, adding to the shopping cart, favoriting/bookmarking, or sharing, etc.

In the embodiments of this application, the feature information includes characteristics related to users as well as to products, specifically encompassing user features and product features. User features include but are not limited to at least one of the following: name, nickname, gender, age, or historical behavior, etc. Product features can include static and dynamic features. Static features include but are not limited to at least one of the following: product name, place of dispatch, dispatch time, evaluations, or after-sales information, etc. Dynamic features include but are not limited to statistical information about the product, such as the number of transactions within 3 days or a month, the total number of positive reviews, or the number of times recommended, etc.

S103: Send the current product's information and feature information to the server.

S104: Receive information about similar products returned by the server. These similar products are selected by the server from the product database as being similar to the current product and are obtained after sorting and filtering based on the feature information.

The similar products selected by the server can be those that share the same category as the current product.

In the embodiments of this application, the product database refers to the initial collection of products, including all products that can be recommended to users. The product database usually contains a very large number of products, even reaching massive quantities, such as 20,000 products or 200 million products, etc. "Selecting" refers to choosing products from the product database that meet a specified strategy, essentially filtering the products according to a designated strategy to obtain the required products. In this embodiment, selecting similar products to the current product means filtering out products in the product database that are similar to the current product, while other products, apart from the similar ones, are not considered.

In the embodiments of this application, the aforementioned feature information not only includes user characteristics and product characteristics but can also encompass contextual features. Contextual features refer to characteristics related to environmental factors, which include, but are not limited to: the exposure location of the product or the site information currently visited by the user, without specific limitation.

In the embodiments of this application, the sorting and filtering involved refers to initially arranging similar products based on feature information, and then filtering out a specified number of similar products in descending order of ranking. This approach can narrow down the scope of product recommendations, preventing excessive noise among similar products, thereby enhancing recommendation efficiency and saving computational resources. This is particularly effective in avoiding wastage of computational resources in the case of massive data sets.

S105: Insert a second region of original size on the page.

In the embodiments of this application, in one embodiment, the browsing direction of the page is vertical. The page is arranged with multiple columns in the horizontal direction, wherein the original size width is the column width, and the height corresponds to the height of the product information display area.

Alternatively, in another embodiment, the browsing direction of the page is horizontal. The page is arranged with multiple rows in the vertical direction, wherein the original size width corresponds to the width of the product information display area, and the height is equivalent to the row height.

S106: Display information of similar products within the second area.

In this regard, the similar products in the second area can be displayed in the form of cards. For example, the second area occupies one column on the left side of the page, comprising either 3 or 4 cards. Each card includes one similar product and may specifically include information such as the name and price of the similar product, although the embodiments of this application are not specifically limited to this arrangement.

In the embodiments of this application, the similar products sorted and filtered by the server can be re-sorted. This can specifically be done according to the principle of having different attributes for adjacent products, and ultimately returning the information of the re-sorted similar products. The purpose of having different attributes for adjacent products is to disrupt the order of similar products obtained after sorting and filtering, that is, to re-sort them. The principle of different attributes for adjacent products can vary, such as every two adjacent products having different attributes, or at least one product among all adjacent products being different from the current product, etc. The specific rule to be adopted is not specifically limited in the embodiments of this application. The purpose of reordering is to spread out highly similar products as much as possible to avoid causing user aversion and visual fatigue due to the concentrated display of highly similar products in a specific area, thereby enhancing the user experience.

In the embodiments of this application, in one embodiment, the following step can be included after the aforementioned step S106:

within the first area's recommended products, perform a down-weighting operation on products that belong to the same category as the current product. The down-weighting operation includes reducing the sorting priority or removing the display.

In this regard, since the second area already displays similar products to the current item, if the first area still includes products of the same category as the current item, it would weaken the effectiveness of displaying similar products in the second area. This can also potentially confuse users, making it difficult to distinguish the meaning of the first and second areas. Therefore, the benefit of the down-weighting operation is that, in one approach, it removes products of the same category as the current item from the first area and does not display them. This allows for complementary interaction between the first and second areas, fully achieving diverse recommendations. In another approach, if the priority ranking of products of the same category as the current item is lowered within the first area, it can prioritize the display of products with different categories from the current item, also achieving the effect of diverse recommendations. Both of these approaches prevent the screen from being filled with repetitive results, avoiding user aversion and enhancing user-friendliness.

The method provided in the embodiments of this application achieves recommendations based on user interactive behavior. The similar products recommended in the second area not only meet the user's precise needs but also form diverse recommendation results together with the recommended products in the first area. This approach balances the dual recommendation goals of precision and diversity, continuously broadening the user's interests, and avoiding user browsing fatigue caused by a single information stream. Additionally, the insertion of the second area in the page eliminates the need for users to navigate separately, making the operation simple and straightforward. The display of similar products provides timely feedback on user intent, enabling real-time perception of user behavior, achieving personalized interactive recommendations, enhancing user engagement, and increasing the awareness of user interaction.

Figure 2:
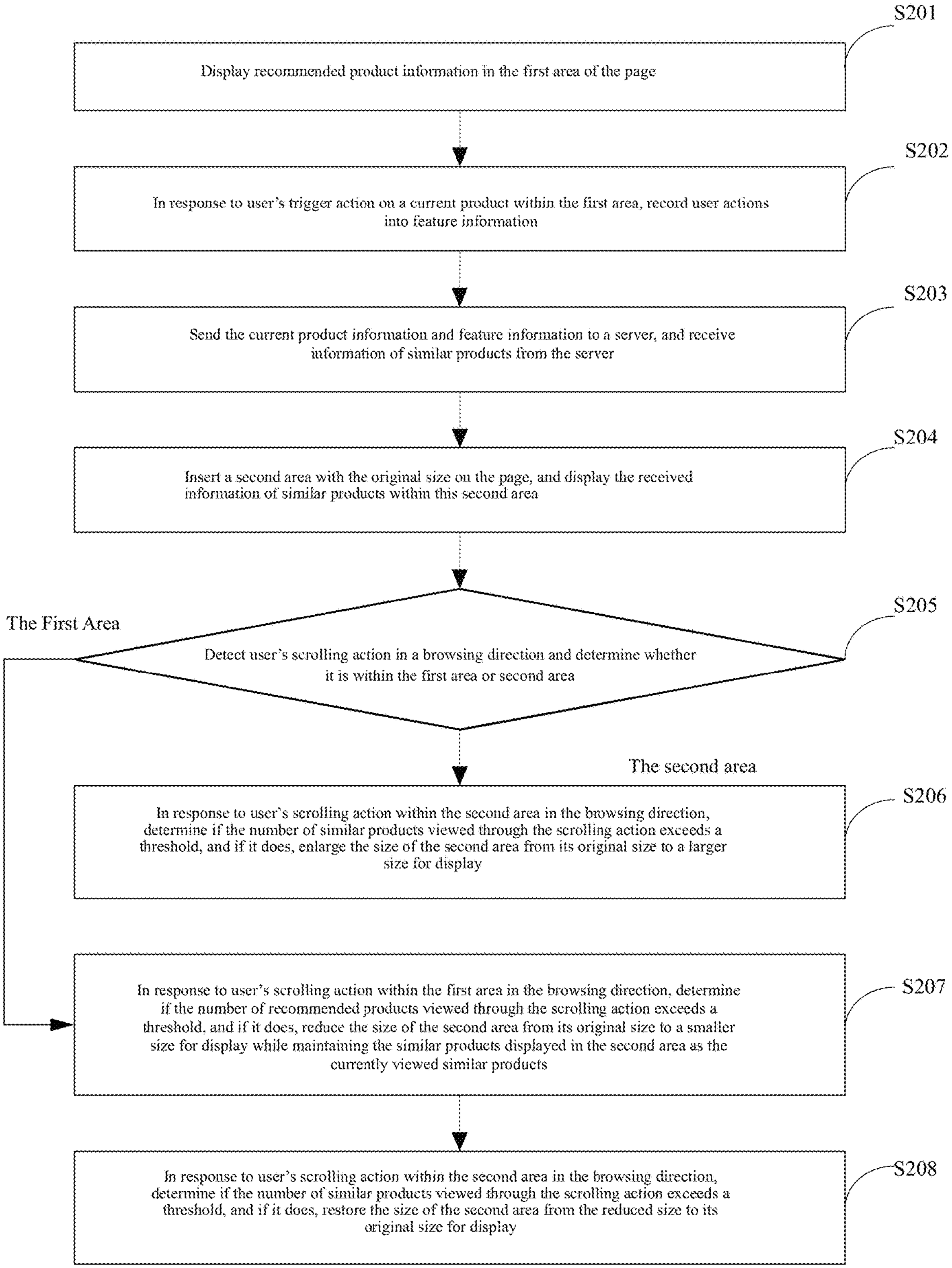
FIG. 2 is another flowchart of the interactive recommendation method according to an embodiment of this application.

The embodiments of this application provide an interactive recommendation method applied on the client side. As shown in FIG. 2, the flowchart of an embodiment of the interactive recommendation method is provided in this application. This method can include the following steps.

S201: Display information about recommended products in the first area of the page.

S202: In response to user-triggered actions on the current product in the first area, record the user's behavior in the feature information.

In this regard, the aforementioned feature information includes user characteristics and product characteristics, and user behavior is one of the aspects of user characteristics. It can encompass real-time user behavior as well as historical behavior.

S203: Send the information of the current product and the feature information to the server and receive information about similar products returned by the server.

In this context, similar products are products selected by the server from the product database that are similar to the current product and have undergone sorting and filtering based on feature information. Specifically, similar products may belong to the same category as the current product.

S204: Insert a second area of original size on the page and display the information of the received similar products within the second area.

S205: Detect user scrolling actions along the browsing direction and determine whether the scrolling action is within the first area or the second area. Scrolling actions may include swiping, sliding, or scrolling. If it is within the second area, proceed to S206; if it is within the first area, proceed to S207.

S206: In response to the user's scrolling action along the browsing direction within the second area, determine whether the number of similar products browsed by the scrolling action exceeds a threshold. If it does, enlarge the size of the second area from the original size to the enlarged size for display, and the process ends.

In this context, the enlarged size has an area greater than the original size, such as 120% of the area of the original size, for example. The threshold mentioned above can be set according to needs, and the specific numerical value is not limited, such as setting it to 2 or 3, for example. The enlarged second area can display more product information on the information stream, including but not limited to reviews, shipping methods, or promotional activities, making it convenient for users to learn more about the products. Users can continuously receive similar product recommendations, fully satisfying their desire to explore around the current product and enhancing the user experience.

S207: In response to the user's scrolling action along the browsing direction within the first area, determine whether the number of recommended products browsed by the scrolling action exceeds a threshold. If it does, reduce the size of the second area from the original size to the reduced size for display, and maintain the display of similar products in the second area as the similar products currently being browsed.

In this context, the reduced size has an area smaller than the original size, such as 70% of the area of the original size, for example. For instance, if the original size of the second area is equivalent to the length of 3 cards, the reduced size can be 1.2 cards in length, while the width remains unchanged. The threshold mentioned above can be set according to needs, and the specific numerical value is not limited, such as setting it to 3 or 4, for example. The display in the reduced size ensures that when users become fatigued from browsing, similar products no longer occupy too much screen real estate, while the first area continues to provide users with diverse recommendation results.

In this embodiment, while reducing the size of the second area proportionally decreases its surface area, the content within the second area is not scaled down in a manner that preserves content by proportionally reducing text and images. Instead, it is reduced through a cropping process. This can also be understood as a progressive loss of the originally displayed content during the reduction of the second area, with content diminishing until the desired reduced size is reached. Therefore, maintaining the display of similar products in the second area as those currently being viewed means that, upon completion of the reduction, the similar products being currently viewed are not lost and continue to be displayed in the reduced-size second area, while the unviewed similar products have been cropped out and are no longer displayed in the second area. This approach facilitates users to easily return to the second area at any time to continue browsing similar products, allowing them to easily remember the point wherein they left off, thus enhancing the user experience.

S208: In response to the user's scrolling action in the second area along the browsing direction, determine whether the number of similar products viewed through the scrolling action exceeds a threshold. If so, resize the second area from its reduced dimensions back to its original dimensions for display, thereby concluding the process.

The aforementioned threshold can be set as needed, without a specific numerical limitation. For example, it could be set to 3, 5, or another suitable number.

In one embodiment, the aforementioned step S208 can be replaced with the following steps: In response to the user's rollback operation in the first area, maintain the second area at its reduced size for continued display. The rollback operation refers to a scrolling gesture directed towards previously viewed products.

In another embodiment, the aforementioned step S208 can also be replaced by the following steps:

acquiring the categories of products that have been exposed in the second area;

sending the information of the exposed products to the server;

receiving information about diverse products from the server, wherein these diverse products are selected from the product database by the server according to a diversity strategy and ranked and filtered based on feature information; in this diversity strategy, the categories of the exposed products are treated with down-weighting;

displaying the information of the received diverse products in the second area.

In this context, the aforementioned down-weighting can be implemented such that the selected diverse products do not include the categories of products already exposed in the second area, or, among the various categories included in the diverse products, the category of products already exposed in the second area is assigned with the lowest weight.

As an example, when a user clicks on the current product “rice cooker” in the first area of the page, the server returns similar products to “rice cooker” selected from the product database. Subsequently, the client inserts a second area on the page to display these similar products, such as various types and prices of rice cookers, thus completing the similar product recommendation process. If the user performs a scrolling action in the first area, the second area is reduced from its original size to a smaller size for display, and then the diversity recommendation process begins. The client determines that the category of products exposed in the second area is “kitchen appliances.” The server selects diverse products from the product database according to a diversity strategy, wherein the category “kitchen appliances” is treated with down-weighting. This strategy can include a variety of products from other categories, resulting in a diverse selection of products such as clothing, hats, mobile phones, sports goods, mother and baby products, digital devices, or books. The server ranks and filters these diverse products based on feature information, including user characteristics and product features, and reorders them according to the principle of differing attributes in adjacent products. The information of the re-sorted diverse products is then returned to the client. Upon receipt, the client displays this information in the second area, thereby completing the process of recommending diverse products.

The methods provided in the embodiments of this application achieve recommendations based on user interaction behaviors. The similar products recommended in the second area not only meet the users’ need for precision but, in conjunction with the recommended products in the first area, constitute a diversified set of recommendation results. This approach balances both precision and diversity in the recommendation goals, continually expanding the boundaries of user interests and avoiding user browsing fatigue caused by a monotonous information flow. Additionally, the second area is inserted into the page, requiring no extra navigation from the user, thus making the operation straightforward and user-friendly. The display of similar products provides timely feedback on user intent, achieving real-time perception of user behavior and personalized interactive recommendations, which enhances user engagement and perception of the interaction. Furthermore, for scenarios wherein similar products have already been exposed in the second area, further diversified recommendations can be made. By lowering the weight of the categories of exposed products and selecting diverse products, the recommendations deepen the diversity based on similar product suggestions, offering users more choices, enriching the recommendation results, and enhancing the user experience.

Figure 3:
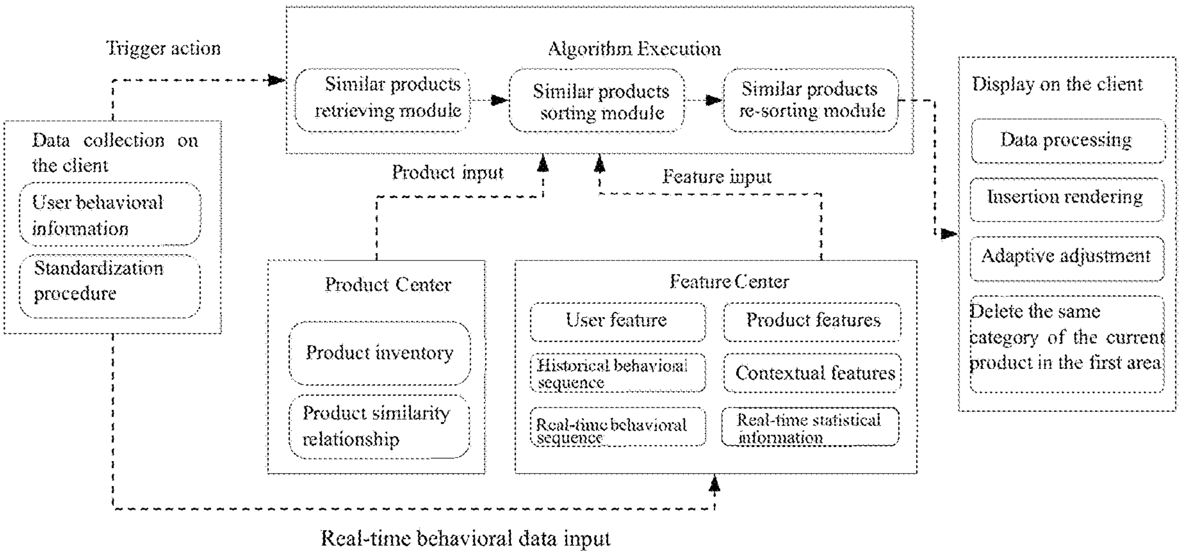
FIG. 3 is a schematic diagram of the interactive recommendation method in another embodiment of this application.

FIG. 3 is a schematic diagram of the interactive recommendation process according to another embodiment of this application. As shown in FIG. 3, the product center stores a product database and product similarity relationships. The feature center stores user features, product features, and contextual features. User features include a historical behavior sequence, i.e., multiple historical behaviors generated by the user. Initially, the client displays recommended product information in the first area of the page, collects user-triggered actions for the current product in the first area, and in response to these actions, records the user’s behavior in the feature center, generating a behavior sequence. Simultaneously, real-time statistical information of products can also be generated in the feature center as part of the product features for storage. After the client sends the current product’s information and feature information to the server, the server uses a similar product selection model to find candidate products in the same category as the current product from the product database in the product center, and based on the product similarity relationships, finds candidate products that are similar to the current product, thus completing the selection of similar products. Using a similar product ranking model based on various features stored in the feature center, the selected similar products are ranked and filtered. The similar product reordering model then reorders the ranked and filtered similar products according to the principle of differing attributes in adjacent products. Finally, the server returns the information of the re-sorted similar products to the client, which, upon reception, inserts the second area in its original size on the page, performs card-like data processing of the received similar product information, and displays it in the second area. If the user performs a scrolling action in the second area and browses more than three similar products, the size of the second area is adaptively adjusted to an enlarged display size, while recommended products in the same category as the current product are deleted from the first area, thus achieving interactive recommendations.

Figure 4:
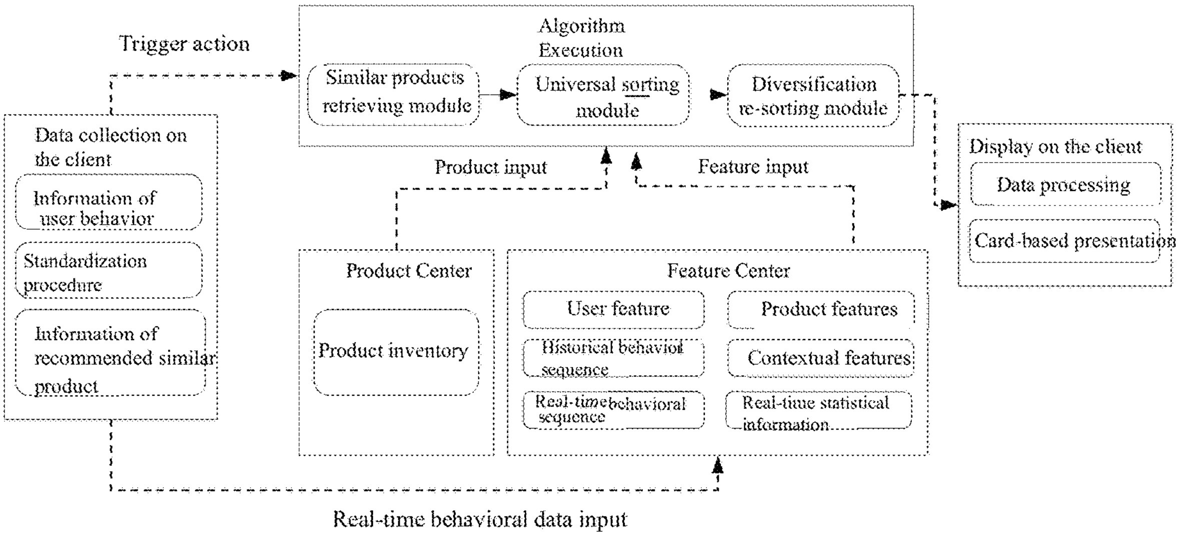
FIG. 4 is a schematic diagram of the diversity recommendation method in another embodiment of this application.

FIG. 4 is a schematic diagram of the diversity recommendation process according to another embodiment of this application. As shown in FIG. 4, the product center stores a product database. The feature center stores user features, product features, and contextual features, wherein user features include a historical behavior sequence and a current behavior sequence, and product features include real-time statistical information of products. The client has already displayed recommended products in the first area of the page and exposed similar products in the second area. In response to the user’s scrolling action in the first area along the browsing direction, the client determines whether the number of recommended products viewed through the scrolling action exceeds a threshold. If so, the size of the second area is reduced from its original dimensions to a smaller size for display. Then, the client identifies the category of products exposed in the second area and sends the information of the exposed products to the server. The server, following a diversity strategy, uses a diversification selection model to select diverse products from the product database in the product center. In this diversity strategy, the category is treated with down-weighting, and a variety of products from other categories are included to achieve diversity. The server then uses a general sorting model to rank and filter the diverse products based on user features and product features included in the feature information. The diverse products, after being sorted and filtered, are reordered by a diversification reordering model according to the principle of differing attributes in adjacent products. Finally, the server returns the information of the re-sorted diverse products to the client. Upon receipt, the client performs card-like data processing and displays the information in the form of cards in the second area, thus completing the process from similar product recommendation to diverse product recommendation.

Figure 5:
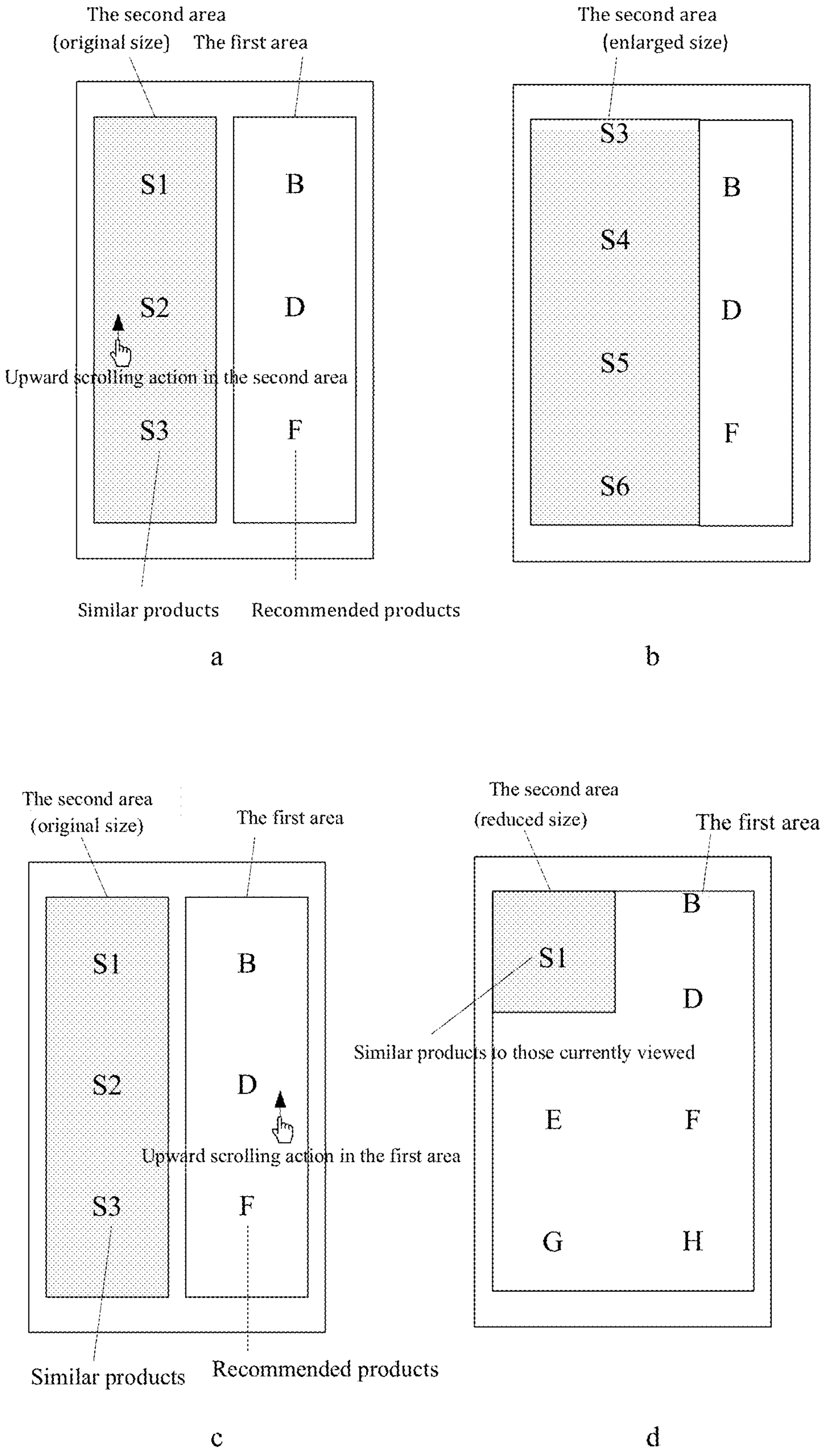
FIG. 5 is a diagram illustrating the size change of the second area in another embodiment of this application.

FIG. 5 is a schematic diagram illustrating the size changes of the second area in another embodiment of this application. As shown in FIG. 5*a*, the client displays two columns on the page, with the left column being the second area and the right column being the first area. The second area is generated and inserted into the page after a current product in the first area is clicked. The first area includes three cards, corresponding to recommended products D, F, and H. The second area is in its original size, with a height matching the height of the product information display area and a width filling the column width, i.e., spanning the entire width of one column. The second area includes three cards, corresponding to similar products S1, S2, and S3 of the current product. As shown in FIG. 5*b*, when the user performs an upward scrolling action in the second area, and if the number of similar products browsed by this operation exceeds three, the client enlarges the size of the second area from the original size to an enlarged size for display, such as an area covering 70% of the page. At this point, the content displayed in the second area has been updated to another three cards, corresponding to similar products S4, S5, and S6. It is clear from the figure that the width of the second area has increased, partially covering the first area, creating a more prominent display effect and achieving personalized interactive recommendations. As shown in FIG. 5*c*, after the client displays the second area in its original size, if the user performs an upward scrolling action in the first area, the client reduces the size of the second area from the original size to a smaller size for display. As shown in FIG. 5*d*, only one card is displayed, corresponding to similar product S1, thus maintaining the similar products in the second area as those currently being browsed. Meanwhile, the area of the first area increases, displaying more content, which has been updated from the original three cards, i.e., recommended products B, D, and F, to five cards, i.e., recommended products D, E, F, G, and H.

Figure 6:
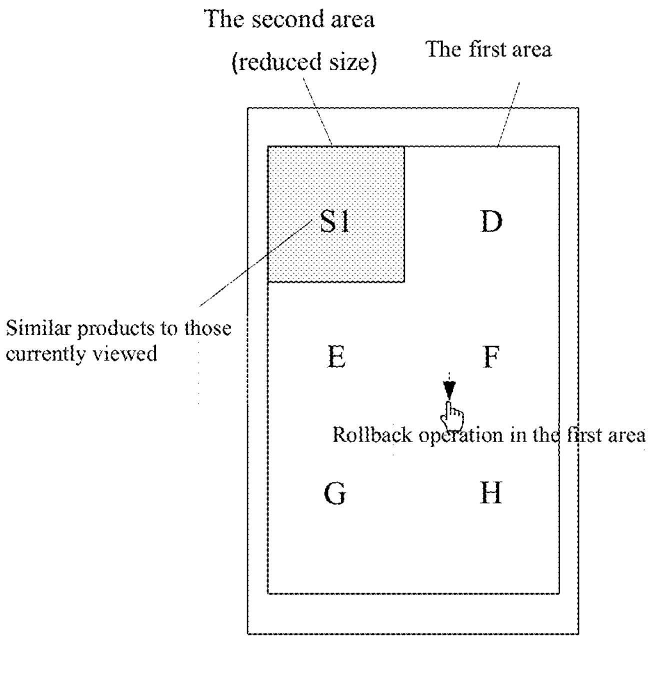
FIG. 6 is a schematic diagram of the reduced-size second area and the corresponding page for the rollback operation in another embodiment of this application.

FIG. 6 is a schematic diagram of the reduced-size second area and the corresponding page for the rollback operation in another embodiment of this application. As shown in the left image, the client has already displayed the second area in a reduced size, with the currently browsed similar product being S1, and the recommended products displayed in the first area include D, E, F, G, and H. As shown in the right image, if the user performs a rollback operation in the first area, the client maintains the second area in its reduced size for continued display, still showing the currently browsed similar product S1. At this time, the first area updates the displayed cards following the rollback operation, with the updated cards corresponding to recommended products A, B, D, E, and F. Of course, if the user later performs an upward scrolling action in the first area, and the number of products browsed by the scrolling action exceeds three, the second area can be restored from the reduced size to its original size for display. This achieves a dynamic adjustment of the recommendation strategy and display effect based on user behavior, handing over the control of adjusting the depth and breadth of the information flow recommendation to the user. This approach not only allows for precise recommendations based on the user's current interest points but also offers a variety of recommendation results through the scrolling action in the first area when the user experiences browsing fatigue, helping to find new interest points.

It takes into account both the personalization and diversity of recommendations, thereby enhancing the effectiveness of the recommendations.

Figure 7:
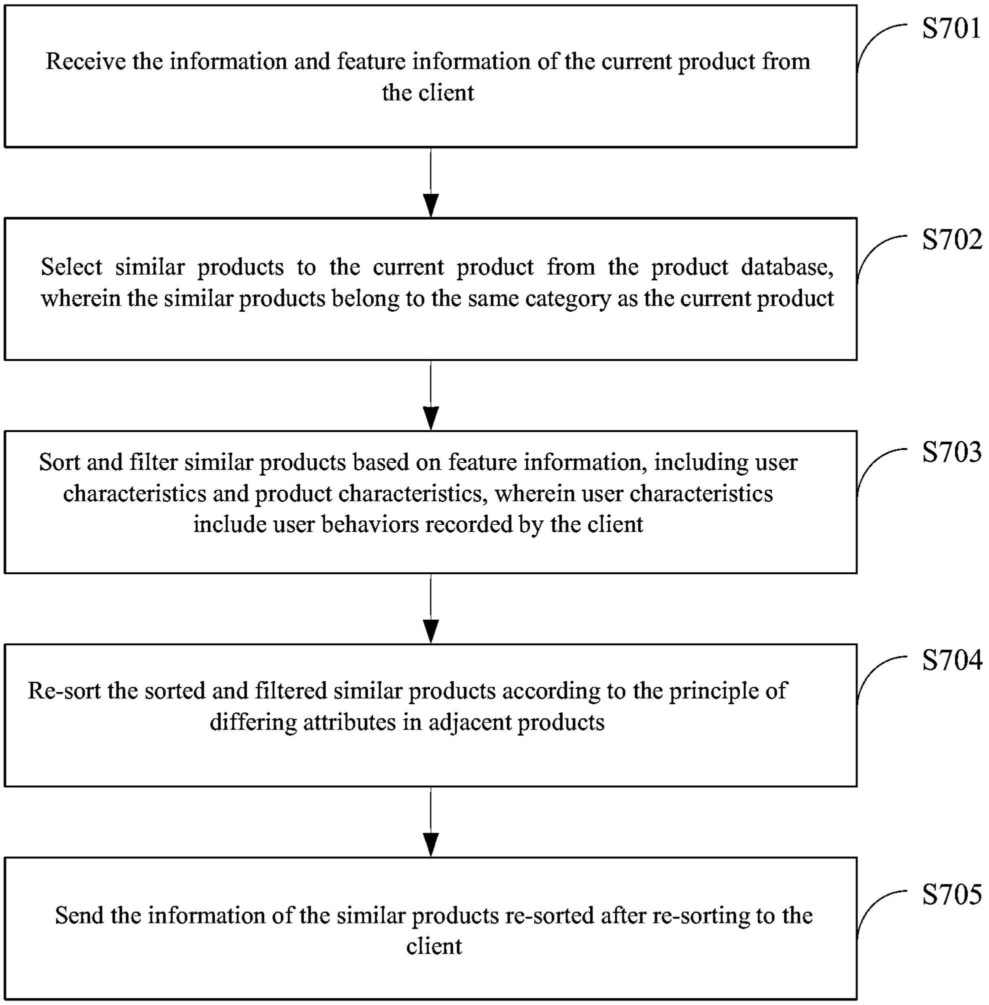
FIG. 7 is a flowchart of the interactive recommendation method according to another embodiment of this application.

The embodiments of this application provide an interactive recommendation method, applied at the server side. As shown in FIG. 7, which is a flowchart of the interactive recommendation method in one embodiment of this application, the method can include the following steps.

S701: Receive the information and feature details of the current product sent from the client.

S702: Select similar products to the current item from the product database, wherein the similar products belong to the same category as the current item.

S703: Rank and filter similar products based on feature information, including user characteristics and product features, wherein user characteristics encompass user behaviors recorded by the client.

In the embodiments of this application, further, it is also possible to consider combining contextual features for the ranking and filtering of similar products. Specifically, the aforementioned step S703 can include:

based on the feature information comprising user characteristics, product features, and contextual elements, sorting and filtering similar products.

In the aforementioned scenario, the feature information includes not only user characteristics and product features, but also contextual elements. Here, contextual elements refer to characteristics related to environmental factors, encompassing but not limited to: the exposure location of the product or information about the site currently being visited by the user, without specific limitations.

The sorting and filtering process involved in the embodiments of this application refers to initially sorting similar products based on feature information, and then filtering out a specified number of these products in a descending order of ranking. This method effectively narrows the scope of product recommendations, thus reducing noise among similar products. It enhances the efficiency of recommendations, conserves computational resources, and is particularly advantageous in preventing the waste of computational resources when dealing with large volumes of data.

S704: Re-sort the filtered similar products according to the principle of differing adjacent product attributes.

S705: Send the information of the re-sorted similar products to the client-side.

In one embodiment, the aforementioned step S702 may specifically include:

identifying candidate products in the product database that belong to the same category as the current product;

finding candidate products that have a known similarity relationship with the current product, thus obtaining similar products for the current item.

Here, a similarity algorithm can be employed in advance to calculate the similarity between every two products in the product database. Based on the results of this similarity calculation, pairs of products with similar relationships can be identified, thereby obtaining a collection of similar relationships, i.e., the product similarity relationship, which includes all pairs of products that have a similarity relationship.

For instance, if the product database includes 10,000 products, and within this database, 2,000 candidate products belonging to the same category as the current product are identified. Furthermore, 1,000 candidate products that have a known similarity relationship with the current product are found in the existing product similarity relationships, ultimately resulting in 1,000 similar products for the current item.

In one embodiment, the aforementioned method may further include:

receiving information about products that have been exposed in a second area from the client-side, wherein the second area is designated for displaying information about similar products;

selecting diverse products from the product database according to a diversity strategy, wherein the categories of products that have already been exposed are treated with reduced priority in the diversity strategy;

sorting and filtering the diverse products based on feature information, which includes user characteristics and product features, wherein user characteristics encompass the user's behavior as recorded by the client;

re-sorting the filtered diverse products according to the principle of differing adjacent product attributes; sending the information of the re-sorted diverse products to the client.

In this embodiment, the provided method involves receiving information and feature data of the current product sent by the client-side, selecting similar products for the current product from the product database, and sorting and filtering these similar products based on feature information. Afterward, the products are re-sorted according to the principle of differing adjacent product attributes. The information of the re-sorted similar products is then sent back to the client. This approach realizes recommendations based on user interaction behavior, fulfilling the need for precise user targeting. It continually expands the boundaries of user interests, thereby preventing user browsing fatigue caused by a monotonous information flow.

Figure 8:
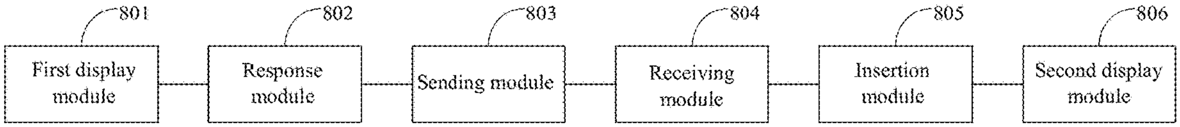
FIG. 8 is a structural block diagram of the interactive recommendation device in another embodiment of this application.

Corresponding to the application scenario and method provided in this embodiment of the application, an interactive recommendation device is also provided, which is applied at the client side. As shown in FIG. 8, which illustrates a structural block diagram of the interactive recommendation device according to an embodiment of this application, the device may include:

a first display module 801 for displaying information about recommended products in the first area of the page;

a response module 802 for responding to user-triggered actions regarding the current product within the first area, recording the user's behavior into the feature information, which includes both user characteristics and product features;

a sending module 803 for sending the information and feature data of the current product to the server;

receiving module 804 for receiving information about similar products returned from the server, wherein the similar products are selected by the server from the product database and are obtained after sorting and filtering based on feature information;

an insertion module 805 for inserting a second area of original size on the page;

a second display module 806 for displaying information about similar products within the second area.

In this embodiment, under one embodiment, the browsing direction of the page is vertical, and the page is arranged with multiple columns in the horizontal direction. The original size has a width equal to the column width and a height equal to the height of the product information display area. Alternatively, in another embodiment, the browsing direction of the page is horizontal, and the page is arranged with multiple rows in the vertical direction. In this case, the original size has a width equal to the width of the product information display area and a height equal to the row height.

In one embodiment, the second display module 806 is also used for:

after the similar product information is displayed in the second area, in response to the user's scrolling action along the browsing direction in the second area, determining whether the number of similar products viewed by the scrolling action exceeds the threshold; if the number of similar items viewed by the scrolling action exceeds the threshold, the size of the second area will be enlarged from the original size to the enlarged size for display; where, the area of the enlarged size is greater than the area of the original size.

In one embodiment, the second display module 806 is also used for:

after similar product information is displayed in the second area, in response to the user's scrolling action in the browsing direction in the first area, determining whether the number of recommended products viewed by scrolling action exceeds the threshold; if the number of recommended items viewed by the scrolling action exceeds the threshold, the size of the second area is reduced from the original size to the reduced size for display, and the similar items displayed in the second area are kept as the similar items currently viewed; where, the area of the reduced size is less than the area of the original size.

In one embodiment, the second display module 806 is further used for:

after the size of the second area is reduced from its original dimensions to a smaller size for display, in response to the user's scrolling action along the browsing direction within the second area, determining whether the number of similar products viewed by the scrolling action exceeds a threshold; if the number of similar products viewed during the scrolling action exceeds this threshold, then the size of the second area is restored from the reduced size back to the original dimensions for display.

In one embodiment, the second display module 806 is further used for:

after reducing the size of the second area from its original dimensions to a smaller size for display, in response to the user's rollback operation within the first area, maintaining the size of the second area as the reduced size for continued display, wherein the rollback operation refers to a scrolling action in the direction of the products already viewed.

In one embodiment, the second display module 806 is further used for:

acquiring the categories of products that have been exposed in the second area; sending the information of the exposed products to the server, and receiving information about diverse products returned from the server, wherein the diverse products are selected by the server from the product database according to a diversity strategy and are obtained after sorting and filtering based on feature information, and in the diversity strategy, the categories of the exposed products are treated with reduced priority; and displaying the information of the received diverse products within the second area.

In one embodiment, the second display module 806 is further used for:

after displaying information about similar products in the second area, applying a down-weighting operation to products in the first area that belong to the same category as the current product among the recommended products, wherein the down-weighting operation includes either lowering their sorting priority or removing their display.

In the embodiments of this application, the triggering action refers to either a click on the current product or a duration of stay within the display area of the current product that exceeds a specified length of time. User behavior includes at least one of the following: clicking, adding to the shopping cart, favoriting/bookmarking, or sharing. Product features encompass both static and dynamic characteristics, with dynamic features including statistical information about the product.

In the embodiments of this application, the functions of each module in the various devices can be referred to in the corresponding descriptions provided in the aforementioned methods. These modules possess corresponding beneficial effects, which are not reiterated here for brevity.

The device provided in this embodiment realizes recommendations based on user interaction behavior. The similar products recommended in the second area not only meet the user's demand for precision but also, along with the recommended products in the first area, constitute a diversified recommendation result. This approach balances both precision and diversity in the recommendation objectives, continuously expanding the boundaries of user interests and preventing user browsing fatigue caused by a monolithic information stream. Additionally, the second area is inserted within the page, eliminating the need for users to navigate elsewhere, thus simplifying the user experience. The display of similar products provides timely feedback on user intent, enabling real-time perception of user behavior and personalized interactive recommendations. This enhances user engagement and improves the perceptibility of user interactions.

Figure 9:
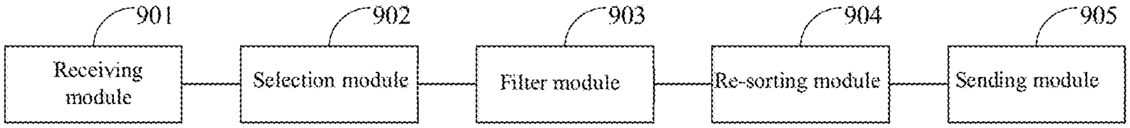
FIG. 9 is another structural block diagram of the interactive recommendation device according to an embodiment of this application.

Corresponding to the application scenario and method provided in this embodiment of the application, this embodiment also offers an interactive recommendation device, applied at the server side. As illustrated in FIG. 9, which shows a structural block diagram of the interactive recommendation device according to an embodiment of this application, the device may include: a receiving module 901 for receiving information about the current product and its feature information sent from the client;

a selection module 902 for selecting similar products from the product database, wherein the similar products share the same category as the current product;

a filtering module 903 for sorting and filtering the similar products based on feature information, which includes user characteristics and product features, wherein user characteristics encompass the user's behavior as recorded by the client;

a re-sorting module 904 for re-sorting the similar products that have been sorted and filtered, based on the principle of differing adjacent product attributes;

a sending module 905 for sending the information of the re-sorted similar products back to the client.

In one embodiment, the selection module 902 can be specifically used for:

identifying candidate products in the product database that belong to the same category as the current product;

finding candidate products that have a known similarity relationship with the current product within the existing product similarity relationships, thereby obtaining similar products for the current item.

In one embodiment, the aforementioned device is also used for:

receiving information about products that have been exposed in a second area from the client, wherein the second area is designated for displaying information about similar products;

selecting diverse products from the product database according to a diversity strategy, wherein the categories of products that have already been exposed are treated with reduced priority in the diversity strategy;

sorting and filtering the diverse products based on feature information, which includes user characteristics and product features, wherein user characteristics include the user's behavior as recorded by the client;

re-sorting the filtered diverse products according to the principle of differing adjacent product attributes; sending the information of the re-sorted diverse products to the client.

The device provided in this embodiment, by receiving information about the current product and its feature data sent from the client, selects similar products for the current product from the product database. After sorting and filtering these similar products based on feature information, and then re-sorting them according to the principle of differing adjacent product attributes, the device sends the information of the re-sorted similar products back to the client. This realizes recommendations based on user interaction behavior, fulfilling the need for precise user targeting. It continually expands the boundaries of user interests and prevents user browsing fatigue caused by a monolithic information stream.

Figure 10:
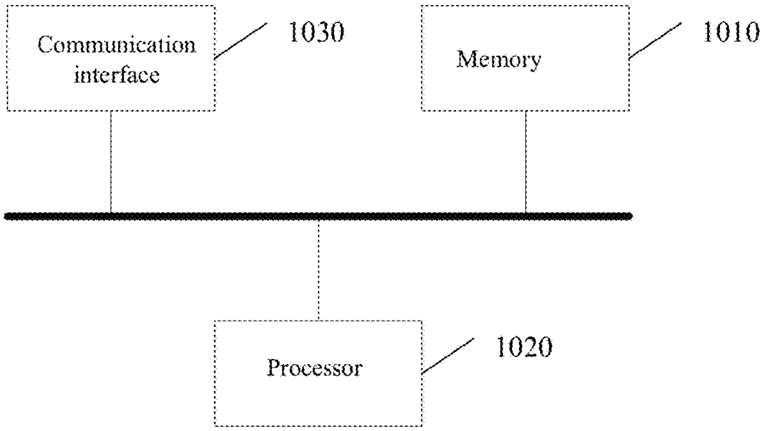
FIG. 10 is a block diagram of an electronic device used to implement embodiments of this application.

FIG. 10 is a block diagram of an electronic device used to implement the embodiments of this application. As shown in FIG. 10, the electronic device includes: a memory unit 1010 and a processor 1020. Stored within the memory unit 1010 is computer program that can run on the processor 1020. When the processor 1020 executes this computer program, it implements the methods described in the aforementioned embodiments. The number of memory units 1010 and processors 1020 can be one or more.

The electronic device also includes: a communication interface 1030 for communicating with external devices and for data exchange and transmission.

If the memory 1010, processor 1020, and communication interface 1030 are implemented independently, they can be interconnected and communicate with each other via a bus. This bus can be an Industry Standard Architecture (ISA) bus, Peripheral Component Interconnect (PCI) bus, Extended Industry Standard Architecture (EISA) bus, etc. The bus may be divided into an address bus, data bus, control bus, etc. For ease of representation, only a single thick line is shown in the figure, but this does not imply that there is only one bus or only one type of bus.

Optionally, in specific implementations, if the memory 1010, processor 1020, and communication interface 1030 are integrated on a single chip, they can communicate with each other through an internal interface.

The embodiments of this application provide a computer-readable storage medium that contains computer program. When the program is executed by a processor, it implements the methods provided in the embodiments of this application.

The embodiments of this application also provide a chip that includes a processor. This processor is designed to fetch and execute instructions stored in a memory, enabling a communication device equipped with the chip to perform the methods provided by the embodiments of this application.

The embodiments of this application also provide a chip, which includes: an input interface, an output interface, a processor, and a memory. These components are interconnected via an internal connection pathway. The processor is used to execute code stored in the memory. When the code is executed, the processor carries out the methods provided by the embodiments of this application.

It should be understood that the processor mentioned above can be a Central Processing Unit (CPU) but can also be other general processors, Digital Signal Processors (DSPs), Application Specific Integrated Circuits (ASICs), Field Programmable Gate Arrays (FPGAs), or other programmable logic devices, discrete gates, or transistor logic devices, discrete hardware components, and so on. The general processor can be a microprocessor or any conventional processor, and it's worth noting that the processor can support the Advanced RISC Machines (ARM) architecture.

Furthermore, optionally, the above-mentioned memory may include read-only memory (ROM) and random-access memory (RAM). This memory can be volatile or non-volatile and may include both volatile and non-volatile memory. Non-volatile memory may include read-only memory (ROM), programmable read-only memory (PROM), erasable programmable read-only memory (EPROM), electrically erasable programmable read-only memory (EEPROM), or flash memory. Volatile memory may include random-access memory (RAM), which is used as external high-speed cache. By way of example and not limitation, many forms of RAM can be used. For example, static random-access memory (SRAM), dynamic random-access memory (DRAM), synchronous dynamic random-access memory (SDRAM), double data rate synchronous dynamic random-access memory (DDR SDRAM), enhanced SDRAM (ESDRAM), synchronous link dynamic random-access memory (SLDRAM), and direct Rambus RAM (DR RAM).

In the above-described embodiments, it can be wholly or partially implemented using software, hardware, firmware, or any combination thereof. When implemented using software, it can be wholly or partially in the form of a computer program product. A computer program product includes one or more computer instructions. When the computer instructions are loaded and executed on a computer, it generates all or part of the processes or functionality described in this application. The computer can be a general-purpose computer, a special-purpose computer, a computer network, or another programmable device. Computer instructions can be stored on computer-readable media or transferred from one computer-readable medium to another.

In the description of this specification, terms such as "an embodiment," "some embodiments," "examples," "specific examples," or "some examples" are intended to mean that specific features, structures, materials, or characteristics described in conjunction with that embodiment or example are included in at least one embodiment or example disclosed in this application. Furthermore, specific features, structures, materials, or characteristics described can be combined in an appropriate manner in any one or more embodiments or examples. Additionally, in cases that are not mutually contradictory, those skilled in the art can combine and integrate different embodiments or examples described in this specification along with the features of different embodiments or examples.

Additionally, the terms "first" and "second" are used solely for descriptive purposes and should not be interpreted to indicate or imply relative importance or specify the quantity of the indicated technical features. Consequently, features labeled as "first" and "second" may explicitly or implicitly include at least one of that feature. In the description provided in this application, the term "multiple" means two or more unless otherwise explicitly specified.

The processes or methods described in the flowcharts or otherwise in this document can be understood as modules, segments, or portions of code representing one or more executable instructions for implementing specific logical functions or processes. The scope of preferred embodiments of this application includes alternative implementations in which steps may not be presented or discussed in the order shown, including performing functions in a substantially simultaneous or reverse order, based on the functionality involved.

The logic and/or steps described in the flowcharts or otherwise in this document may be understood as a sequentially ordered list of executable instructions for implementing logical functions. These instructions can be specifically implemented in any computer-readable medium for use by an instruction execution system, device, or equipment (such as a computer-based system, including a processor-based system, or other systems capable of fetching and executing instructions) or in conjunction with these instruction execution systems, devices, or equipment.

It should be understood that various parts of this application can be implemented using hardware, software, firmware, or a combination thereof. In the above-described embodiments, multiple steps or methods can be implemented by software or firmware stored in memory and executed by a suitable instruction execution system. All or part of the steps of the aforementioned method embodiments can be accomplished by hardware under the command of a program, which can be stored in a computer-readable storage medium. When executed, this program includes one or more of the steps of the method embodiments or a combination thereof.

Furthermore, in various embodiments described in this application, individual functional units may be integrated into a single processing module or may exist as separate physical units. Additionally, two or more units may be integrated into a single module. These integrated modules can be implemented in hardware form or in the form of software functional modules. If the integrated modules are implemented in the form of software functional modules and are sold or used as standalone products, they can also be stored on computer-readable storage media. Such storage media can include read-only memory, disks, optical discs, and more.

It should be noted that the embodiments described in this application may involve the use of user data. In actual applications, such usage should be carried out in compliance with applicable laws and regulations in the respective country (e.g., with the explicit consent of the user, providing proper notification to the user, etc.). The use of specific user personal data in the schemes described in this document should be within the permissible limits of applicable laws and regulations.

The above description is merely exemplary embodiments of the present application, and the scope of protection of the present application is not limited to these embodiments. Any person skilled in the art, within the technical scope described in this application, can readily conceive of various changes or substitutions, and all of these should be encompassed within the scope of protection of the present application. Therefore, the scope of protection of the present application should be determined by the scope of protection of the claims.

What is claimed is:

1. An interactive recommendation method comprising:
displaying information of recommended products in a first area having an original size on a page;
in response to a user's triggering action on a current product in the first area, recording the user's behavior into feature information, wherein the feature information includes user characteristics and product characteristics;
sending information of the current product and the feature information to a server;
receiving information of similar products from the server, wherein the similar products are selected by the server from a product database, and are resulted from sorting and filtering based on the feature information;
inserting a second area having the original size on the page;
displaying the information of the similar products in the second area;
monitoring for a user's scrolling action along a browsing direction within the second area;
determining whether a number of similar products viewed through the scrolling action exceeds a first threshold; and
dynamically altering a display area of the page by enlarging the size of the second area from the original size to an enlarged size in response to determining the first threshold is exceeded, thereby adapting the display area of the page based on real-time scrolling behavior.

2. The method of claim 1, wherein:
the page's browsing orientation is vertical, with multiple columns arranged horizontally on the page, the width of the original size corresponds to the column width, and the height of the original size corresponds to the height of a product information display area; or,
the page's browsing orientation is horizontal, with multiple rows arranged vertically on the page, the width of the original size corresponds to the width of the product information display area, and the height corresponds to a row height.

3. The method of claim 1, further comprising:
after displaying the information of the similar products in the second area, in response to the user's scrolling action along a browsing direction within the first area, determining whether the number of the recommended products viewed through the scrolling action exceeds a second threshold, and
if the number of the recommended products viewed through the scrolling action exceeds the second threshold, reducing the size of the second area from the original size to a reduced size for display, while maintaining the display of similar products in the second area as currently viewed similar products, wherein the area of the reduced size is smaller than the area of the original size.

4. The method of claim 3, further comprising:
after reducing the size of the second area from the original size to the reduced size for display, in response to the user's scrolling action along the browsing direction within the second area, determining whether the number of the similar products viewed through the scrolling action exceeds a third threshold, and
if the number of the similar products viewed through the scrolling action exceeds the third threshold, restoring the size of the second area from the reduced size to the original size for display.

5. The method of claim 3, further comprising:
after reducing the size of the second area from the original size to the reduced size for display, in response to the user's rollback operation within the first area, maintaining the size of the second area as the reduced size for continued display, wherein the rollback operation includes a scrolling action directed towards previously browsed recommended products.

6. The method of claim 3, further comprising:
after reducing the size of the second area from the original size to the reduced size for display:
obtaining categories of products that have been exposed in the second area;
sending information of the exposed products to the server;
receiving information of diverse products returned by the server, wherein the diverse products are selected by the server from a product database according to a diversity strategy and sorted and filtered based on the feature information, and in the diversity strategy, the categories of the exposed products are treated with a down-weighting operation; and
displaying the information of the diverse products in the second area.

7. The method of claim 1, further comprising:
after displaying the information of the similar products in the second area, in the recommended products within the first area, performing a down-weighting operation on products that belong to the same category as the current product, wherein the down-weighting operation includes lowering a sorting priority or removing from display.

8. The method of claim 1, wherein:
the triggering action is either a click operation on the current product or staying within the display area of the current product for a duration exceeding a specified length,
the user's behavior includes at least one of the following: clicking, adding to cart, bookmarking, or sharing, and
the product features include both static and dynamic features, wherein the dynamic features include product statistical information.

9. A non-transitory computer-readable storage medium configured with instructions executable by one or more processors to cause the one or more processors to perform operations comprising:
displaying information of recommended products in a first area having an original size on a page;
in response to a user's triggering action on a current product in the first area, recording the user's behavior into feature information, wherein the feature information includes user characteristics and product characteristics;
sending information of the current product and the feature information to a server;
receiving information of similar products from the server, wherein the similar products are selected by the server from a product database, and are resulted from sorting and filtering based on the feature information;
inserting a second area having the original size on the page;
displaying the information of the similar products in the second area;

monitoring for a user's scrolling action along a browsing direction within the second area;

determining whether a number of similar products viewed through the scrolling action exceeds a first threshold; and dynamically altering a display area of the page by enlarging the size of the second area from the original size to an enlarged size in response to determining the first threshold is exceeded, thereby adapting the display area of the page based on real-time scrolling behavior.

10. The non-transitory computer-readable storage medium of claim 9, wherein:

the page's browsing orientation is vertical, with multiple columns arranged horizontally on the page, the width of the original size corresponds to the column width, and the height of the original size corresponds to the height of a product information display area; or, the page's browsing orientation is horizontal, with multiple rows arranged vertically on the page, the width of the original size corresponds to the width of the product information display area, and the height corresponds to a row height.

11. The non-transitory computer-readable storage medium of claim 9, wherein the operations further comprise:

after displaying the information of the similar products in the second area, in response to the user's scrolling action along a browsing direction within the first area, determining whether the number of the recommended products viewed through the scrolling action exceeds a second threshold, and if the number of the recommended products viewed through the scrolling action exceeds the second threshold, reducing the size of the second area from the original size to a reduced size for display, while maintaining the display of similar products in the second area as currently viewed similar products, wherein the area of the reduced size is smaller than the area of the original size.

12. The non-transitory computer-readable storage medium of claim 11, wherein the operations further comprise:

after reducing the size of the second area from the original size to the reduced size for display, in response to the user's scrolling action along the browsing direction within the second area, determining whether the number of similar products viewed through the scrolling action exceeds a third threshold, and if the number of similar products viewed through the scrolling action exceeds the third threshold, restoring the size of the second area from the reduced size to the original size for display.

13. The non-transitory computer-readable storage medium of claim 11, wherein the operations further comprise:

after reducing the size of the second area from the original size to the reduced size for display, in response to the user's rollback operation within the first area, maintaining the size of the second area as the reduced size for continued display, wherein the rollback operation includes a scrolling action directed towards previously browsed recommended products.

14. The non-transitory computer-readable storage medium of claim 11, wherein the operations further comprise:

after reducing the size of the second area from the original size to the reduced size for display:

obtaining categories of products that have been exposed in the second area;

sending information of the exposed products to the server;

receiving information of diverse products returned by the server, wherein the diverse products are selected by the server from a product database according to a diversity strategy and sorted and filtered based on the feature information, and in the diversity strategy, the categories of the exposed products are treated with a down-weighting operation; and displaying the information of the diverse products in the second area.

15. The non-transitory computer-readable storage medium of claim 9, wherein the operations further comprise:

after displaying the information of similar products in the second area, in the recommended products within the first area, performing a down-weighting operation on products that belong to the same category as the current product, wherein the down-weighting operation includes lowering a sorting priority or removing from display.

* * * * *